Nov. 10, 1925.

C. MOTT 1,561,102

VACUUM CONTAINER

Filed April 30, 1924

INVENTOR:
CHESTER MOTT.
BY
Graham + Davis
ATTORNEYS.

Patented Nov. 10, 1925.

1,561,102

UNITED STATES PATENT OFFICE.

CHESTER MOTT, OF DENVER, COLORADO, ASSIGNOR, BY MESNE ASSIGNMENTS, TO PUROX COMPANY, OF DENVER, COLORADO, A CORPORATION OF COLORADO.

VACUUM CONTAINER.

Application filed April 30, 1924. Serial No. 710,011.

*To all whom it may concern:*

Be it known that I, CHESTER MOTT, a citizen of the United States, residing in the city and county of Denver, State of Colorado, have invented a new and useful Improvement in Vacuum Containers, of which the following is a specification.

My invention relates particularly to containers suited to transport liquid air and other low temperature liquids. It is a well known fact that air may be liquefied at very low temperatures, and that when so liquefied, it has a large application in various arts.

The primary object of my invention is to provide a container in which liquid air or the like may be readily transported from place to place without excessive loss. Liquid air boils at a very low temperature and to prevent excessive evaporation, it is necessary to thoroughly heat insulate the containers in which it is shipped, which can conveniently be done by providing concentric vessels separated by a vacuum space. Such vessels are at the present time in use for this purpose. It is highly desirable that these vessels be formed of metal on account of the excessive breakages of other substances, and it is extremely difficult to provide a metal container which is not to some degree porous and subject to slow deterioration of the vacuum due to the leakage of air through the metal.

It is a further object of my invention to provide a container of this type in which the vacuum is self-renewing and self-sustaining. It is common practice in vacuum containers used for transporting liquid air to exhaust the vacuum space by suitable pumps, and then to place in the vacuum space activated charcoal or the like. This charcoal has the property of adsorbing gases, the capacity for adsorption being very greatly increased as the temperature of the charcoal is lowered. The charcoal is preferably so placed that heat is extracted therefrom by the excessively cold liquid air, so that the charcoal rapidly reaches a low temperature. At low temperature the charcoal or carbon readily extracts and adsorbs gas from the vacuum space, very greatly increasing the vacuum and improving the heat insulation of the container. I have found, however, that where liquid air is kept for some time in a container which has a small leak, although the vacuum may be fairly well maintained by the charcoal while the liquid air is kept in the container, after the liquid air has been removed and the charcoal again becomes heated through external heat, the adsorbed gases are liberated from the charcoal into the vacuum space and in some cases the pressure of these gases may rise, after the charcoal becomes heated, to values in excess of atmospheric pressure, so that the vacuum space is filled with compressed air. This results in a failure of the container which cannot be conveniently designed to resist both external and internal pressures.

It is a further object of my invention to provide means in such a container for relieving any pressure so formed and for utilizing the changing adsorptive capacity of the activated charcoal to maintain the vacuum at all times, as will hereinafter be explained.

Further objects and advantages will be made evident hereinafter.

Referring to the drawing which is for illustrative purposes only,

Figure 1:
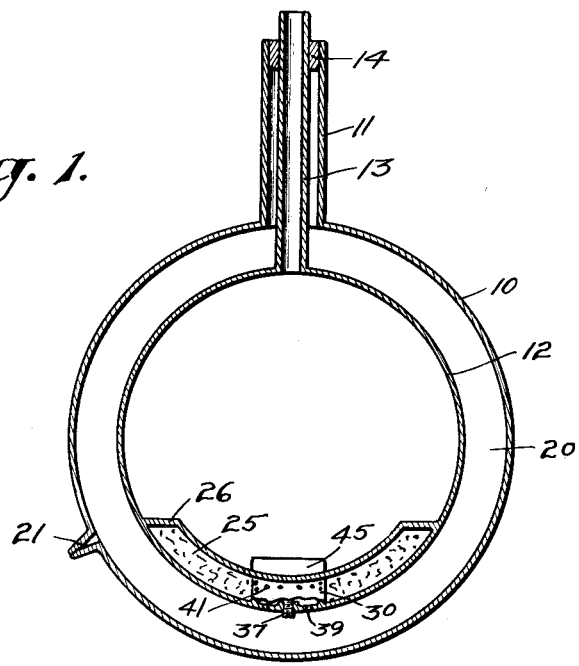
Fig. 1 is an elevation partly in section of a container embodying my invention.
Figure 2:
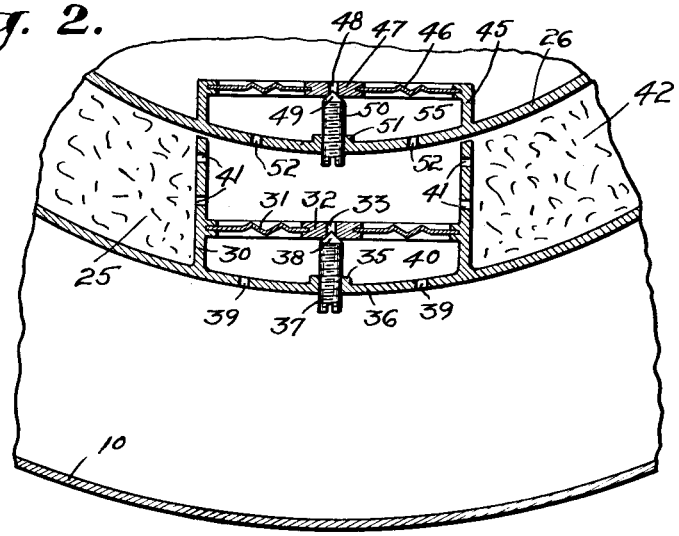
Fig. 2 is a similar section of a portion thereof on an enlarged scale.

In the form of the invention illustrated, 10 is a spherical outer vessel formed of sheet metal and having a long neck 11. An inner spherical vessel 12, also formed of sheet metal, is suspended concentrically inside the vessel 10 by means of a long neck, the necks 11 and 13 being joined together at 14 by a ring which is hermetically sealed thereto. The vacuum space 20 between the vessels 10 and 12 has the air exhausted therefrom through a small tube 21 which is hermetically sealed, after such exhaustion, preferably by welding.

Formed inside the inner vessel 12 by means of a diaphragm 26 is an evacuating chamber 25. The diaphragm 26 is hermetically welded to the inner wall of the inner vessel 12 and the evacuating chamber 25 is filled with activated charcoal.

Welded to the inner wall of the inner vessel 12 is a cylindrical ring 30 in which is secured a diaphragm 31, this diaphragm being also secured at its center to a valve seat 32 having a central opening 33 therein. Threaded in a boss 35 in the wall 36 of the inner vessel 12 is a screw 37 having a conical point 38, this conical point seating in a conical extension of the opening 33 of the valve seat 32. The wall 36 is pierced with holes 39, these holes providing an open communication from the vacuum space to a chamber 40 inside the ring 30 below the diaphragm 31. The screw 37 is preferably initially adjusted so that with an equality of pressure on each side of the diaphragm 31, the valve seat 32 will be held in gastight relationship with the conical end 38 of the screw 37 by the natural elasticity of the diaphragm 31. The ring 30 extends upwardly above the diaphragm 31 and is pierced with small holes 41 which communicate with the interior of the evacuating chamber 25, which is filled with activated charcoal, as indicated at 42. The members 32 and 38 constitute an inlet valve through which gas may be drawn from the vacuum space 20 through the holes 39 into the chamber 40 and through the openings 41 into the avacuating chamber 25.

Secured to the inner wall of the diaphragm 26 is a ring 45 which carries a diaphragm 46, this diaphragm carrying a valve seat 47 having a conical opening 48 seating on the conical end 49 of a screw 50. The screw 50 is threaded in a boss 51 formed in the diaphragm 26. Openings 52 are provided through the diaphragm 26 inside the ring 45, these openings providing an open communication between a chamber 55 (which is formed by the ring 45, the diaphragm 46 and the diaphragm 26) and the evacuating chamber 25. The members 47 and 49 form an outlet valve through which gas may be expelled from the chamber 55 into the interior of the inner vessel 12. The screw 50 is so set that with equal pressures on either side of the diaphragm, the valve seat 47 is seated in gastight relationship on the conical end 49 of the screw 50 by the natural elasticity of the diaphragm 46.

The method of operation of the vacuum maintaining means is as follows:

The vacuum space having been initially exhausted, the inlet valve 32 is held closed by the atmospheric pressure of the gas in the evacuating chamber 25. As soon as liquid air is poured into the inner vessel 12, the activating charcoal 42 is cooled to a very low temperature, thus enormously increasing its gas adsorbing properties. As a result, any gas present in the evacuating chamber 25 is adsorbed by the charcoal and a very high vacuum is produced in the evacuating chamber.

In the event that the vacuum in the vacuum space 20 is not as low as the vacuum in the evacuating space, an unbalanced condition occurs about the diaphragm 31, the pressure on the underside of this diaphragm being in excess of the pressure on the top of the diaphragm so that the diaphragm is lifted and the valve seat 32 is forced upwardly out of contact with the conical end 38 of the screw 37. This allows gas to be drawn through the hole 33 and the holes 41 into the evacuating chamber 25 where this gas is adsorbed by the activated charcoal 42. This continues until the activated charcoal has reached its minimum temperature and its maximum adsorption. At this point a balanced condition is produced on both sides of the diaphragm 31 and the valve seat 32 is forced against the conical end 38 of the screw 37 due to the natural elasticity of the diaphragm. Any tendency for gas to enter the evacuating space 25 through the outlet valve is resisted by an excess of pressure on the top of the diaphragm 46.

Whenever the liquid air is poured from the inner vessel 12, which may be accomplished by pouring through the long neck 13, and outside air is allowed to enter the inner vessel 12, there is a rise of temperature due to the presence of this outer air, and this rise of temperature continues until eventually the entire container is at substantially atmospheric temperature. Due to this general rise in temperature, the activated carbon 42 is also heated, and as it is heated, the adsorbed gas is driven off, the pressure in the evacuating chamber 25 again rising. This rise in pressure continues until such time as the pressure in the evacuating chamber exceeds the atmospheric pressure in the inner vessel 12. At this time there is an unbalanced condition about the diaphragm 46, the pressure on the under side of the diaphragm being sufficient to lift the valve seat 47 and allow gas to escape through the opening 48, this gas being forced upwardly from the evacuating chamber 25 into the inner vessel 12. This continues until a balanced condition is reached as to temperatures and pressures, when the valve seat 47 is again seated due to the elasticity of the material in the diaphragm 46.

If now the container is again filled with liquid air, the cycle just described is repeated, the filling with liquid air causing a very rapid lowering of the temperature and of the pressure in the evacuating chamber 25, the drop in pressure being sufficient to again draw gas from the vacuum space 20 in the event that the vacuum in this space has been at all impaired. It will be seen that the evacuating chamber therefore acts like a pump, drawing gas from the vacuum space through the inlet valve as the activated charcoal is cooled. It is therefore possible, especially in a liquid air container which is frequently filled and emptied, to maintain the integrity of the vacuum in the space 20 even where there is some leakage of air thereto.

Although I prefer to use an inlet and an outlet valve, it is possible in some cases to omit the inlet valve, the evacuating chamber 25 being either omitted and the activated charcoal placed directly in the vacuum space 20, or preferably, the evacuating chamber being used as shown but an open communication being maintained at all times between said chamber and the vacuum space 20. The latter condition will exist if the diaphragm 31 is omitted and the evacuating chamber 25 is left at all times in open communication with the vacuum space 20 through the holes 39 and 41. With either construction, any pressure in excess of atmospheric pressure built up in the vacuum space 20 and the evacuating chamber 25 due to release of gas by the adsorbent material 42 is relieved by the outlet valve. No true pumping action is, however, possible without a separate evacuating chamber and both an inlet and outlet valve as shown.

In the structure shown, the outlet valve discharges through the opening 48 directly into the inner vessel 12. This vessel is at all times in communication with the outer air, since it is impractical to tightly seal liquid air containers. It is obvious that the object of the outlet valve is to discharge the released gases from the evacuating chamber 25 and that these gases can be discharged directly into the outer air or through the inner vessel 12 into the outer air without departing from the spirit of my invention. Since this discharge ordinarily takes place only when the container is empty, either method is equally effective, that shown being merely constructionally the most convenient.

In the embodiment above shown, I utilize the change in adsorbent capacity due to lowering the temperature of the adsorbent material below normal in a liquid air container. Obviously, it is possible to utilize the same principle in containers which are heated above normal and then cooled to normal; and indeed the container shown will function to pump a vacuum if hot liquid be poured therein and then discharged.

My invention, therefore, should not be limited to the preferred embodiment shown, being defined wholly by the annexed claims.

I claim as my invention:

1. A vacuum producing device comprising: walls forming an evacuating chamber; gas adsorbent material whose adsorbing capacity varies with temperature, said gas adsorbent material being situated in said evacuating chamber; means for connecting said evacuating chamber with the space to be evacuated when the temperature of said material is such as to give it a high adsorptive value; and means for closing the connection between said evacuating chamber and the space to be evacuated when said adsorption value is reduced by a change in temperature.

2. A device for producing a vacuum in an enclosed space comprising: walls forming an evacuating chamber connected by a passage with said enclosed space; gas adsorbent material in said evacuating chamber, said gas adsorbent material having the property of changing its adsorbent capacity with changes in temperature; an inlet valve adapted to close said passage; means for normally closing said inlet valve; and means for opening said inlet valve whenever the pressure in said enclosed space exceeds the pressure in said evacuating chamber.

3. A device for producing a vacuum in an enclosed space comprising: walls forming an evacuating chamber connected by a passage with said enclosed space; gas adsorbent material in said evacuating chamber, said gas adsorbent material having the property of changing its adsorbent capacity with changes in temperature; an inlet valve adapted to close said passage; means for normally closing said inlet valve; an outlet valve through which said evacuating space can exhaust into the outer air; means for holding said outlet valve normally closed; means for opening said outlet valve whenever the pressure in said evacuating space rises above atmospheric pressure; and means for opening said inlet valve whenever the pressure in said enclosed space exceeds the pressure in said evacuating chamber.

4. A device for maintaining a vacuum in an enclosed space comprising: gas adsorbent material in said space, said material having the property of changing its adsorbent capacity with changes in temperature; a passage through which gas may be passed from said enclosed space; an outlet valve adapted to close said passage; means for normally holding said valve closed; and means for opening said valve whenever the gas pressure in said enclosed space is sufficient to force gas outwardly through said passage.

5. A container for liquid air comprising: an outer vessel; an inner vessel inside said outer vessel and sealed thereto to form a vacuum space situated between said vessels; gas adsorbent material so placed as to adsorb gas from said vacuum space, said adsorbent material having the property of changing its adsorbent capacity with changes in temperature; an outlet valve normally closing a passage through which gas can be expelled from said adsorbent material; and means for opening said outlet valve whenever the pressure of the gas in contact with said adsorbent material rises above a predetermined value.

6. A container for liquid air comprising: an outer vessel; an inner vessel inside said outer vessel and sealed thereto to form a vacuum space situated between said vessels; gas adsorbent material so placed as to adsorb gas from said vacuum space, said adsorbent material having the property of changing its adsorbent capacity with changes in temperature; an outlet valve normally closing a passage through which gas may be expelled from said vacuum space; and means for opening said valve whenever the gas pressure in said vacuum space rises to a value sufficient to so expel gas.

7. A container for liquid air comprising: an outer vessel; an inner vessel inside said outer vessel and sealed thereto to form a vacuum space between said vessels; walls forming an evacuating chamber connected by an inlet passage with said vacuum space and through an outlet passage with the outside air; adsorbent material in said evacuating chamber, said adsorbent material being of such a character that it changes its capacity to adsorb with changes in temperature, said evacuating chamber being so situated that the temperature of said adsorption material is lowered when liquid air is placed in said container; an outlet valve normally closing said outlet passage; and means for opening said outlet valve whenever the pressure in said evacuating space rises above atmospheric pressure.

8. A container for liquid air comprising: an outer vessel; an inner vessel inside said outer vessel and sealed thereto to form a vacuum space between said vessels; walls forming an evacuating chamber connected by an inlet passage with said vacuum space and through an outlet passage with the outside air; adsorbent material in said evacuating chamber, said adsorbent material being of such a character that it changes its capacity to adsorb with changes in temperature, said evacuating chamber being so situated that the temperature of said adsorption material is lowered when liquid air is placed in said container; an inlet valve normally closing the inlet passage between said vacuum space and said evacuating chamber; means for opening said inlet valve whenever the pressure in said vacuum space exceeds the pressure in said evacuating chamber; an outlet valve normally closing said outlet passage; and means for opening said outlet valve whenever the pressure in said evacuating space rises above atmospheric pressure.

9. A container for liquid air comprising: an outer vessel; an inner vessel inside said outer vessel and sealed thereto to form a vacuum space between said vessels; walls forming an evacuating chamber connected by an inlet passage with said vacuum space and through an outlet passage with the interior of said inner vessel; adsorbent material in said evacuating chamber, said adsorbent material being of such a character that it changes its capacity to adsorb with changes in temperature, said evacuating chamber being so situated that the temperature of said adsorption material is lowered when liquid air is placed in said container; an outlet valve normally closing said outlet passage; and means for opening said outlet valve whenever the pressure in said evacuating space rises above atmospheric pressure.

10. A container for liquid air comprising: an outer vesel; an inner vessel inside said outer vessel and sealed thereto to form a vacuum space between said vessels; walls forming an evacuating chamber connected by an inlet passage with said vacuum space and through an outlet passage with the interior of said inner vessel; adsorbent material in said evacuating chamber, said adsorbent material being of such a character that it changes its capacity to adsorb with changes in temperature, said evacuating chamber being so situated that the temperature of said adsorption material is lowered when liquid air is placed in said container; an inlet valve normally closing the inlet passage between said vacuum space and said evacuating chamber; means for opening said inlet valve whenever the pressure in said vacuum space exceeds the pressure in said evacuating chamber; an outlet valve normally closing said outlet passage; and means for opening said outlet valve whenever the pressure in said evacuating space rises above atmospheric pressure.

In testimony whereof, I have hereunto set my hand at Denver, Colorado, this 19th day of April, 1924.

CHESTER MOTT.